UNITED STATES PATENT OFFICE.

JAMES CHESTON MORRIS, OF PHILADELPHIA, PENNSYLVANIA.

METHOD OF PURIFYING RANCID BUTTER.

SPECIFICATION forming part of Letters Patent No. 232,051, dated September 7, 1880.

Application filed June 10, 1880. (No specimens.)

*To all whom it may concern:*

Be it known that I, JAMES CHESTON MORRIS, a citizen of the United States, residing in Philadelphia, Pennsylvania, have invented an Improvement in Purifying Rancid Butter, of which the following is a specification.

The object of my invention is to restore to its original purity and sweetness butter which has become rancid; and this object I attain by treating the rancid butter with boracic acid or its compounds in the manner hereinafter set forth.

In carrying out my invention I first make a saturated solution, in water, of boracic acid, employing, by preference, three hundred and twenty (320) grains of boracic acid to the pound of butter. The rancid butter is then thoroughly worked in this solution, the operation being continued until all parts of the mass are exposed to the action of the solution.

I have found, in practice, that with a solution of the above-mentioned strength five minutes generally suffices to insure the effective action of said solution on the butter, although if the solution is of a weaker character than that mentioned a longer time will be necessary.

After being subjected to the action of the boracic-acid solution the butter is thoroughly washed in pure water, so as to free the mass from the acid and the butyrates and other impurities which have been freed from the butter by the action of the acid thereon, the impurities, with the acid, being held in solution or suspension by the water, thus leaving the butter in a sweet and wholesome state and ready for treatment with salt or coloring-matter, as when freshly gathered from the churn.

The same solution may be used to treat successive batches of butter until it becomes so affected by the impurities which have been extracted from the butter as to fail to properly perform its duty, in which case the solution may be subjected to distillation or other process, whereby the boracic acid is recrystallized and recovered.

Compounds of boracic acid—such, for instance, as biborate of soda—may in some cases be used in place of the acid itself, although the use of the latter is preferred.

I am aware that boracic acid is well known as an antiseptic, and that its use has hitherto been proposed for preventing the souring of milk and for preserving other articles of food from putrefaction; but I am not aware that it has heretofore been known that butter, after it once became rancid, could be deprived of its impurities and rendered sweet and wholesome by treatment with the acid. Hence,

I claim as my invention and desire to secure by Letters Patent—

The within-described improvement in the art of purifying rancid butter, said improvement consisting in subjecting the butter to the action of a solution of boracic acid or its compounds, as set forth.

In testimony whereof I have signed my name to this specification in the presence of two subscribing witnesses.

J. CHESTON MORRIS.

Witnesses:
JAMES F. TOBIN,
HARRY SMITH.